(12) United States Patent
Orvalho et al.

(10) Patent No.: US 11,508,107 B2
(45) Date of Patent: *Nov. 22, 2022

(54) ADDITIONAL DEVELOPMENTS TO THE AUTOMATIC RIG CREATION PROCESS

(71) Applicant: Didimo, Inc., Oporto (PT)

(72) Inventors: Verónica Costa Teixeira Pinto Orvalho, Oporto (PT); Eva Margarida Ferreira de Abreu Almeida, Oporto (PT); Hugo Miguel dos Reis Pereira, Oporto (PT); Thomas Iorns, Porirua (NZ); José Carlos Guedes dos Prazeres Miranda, Oporto (PT); Alexis Paul Benoit Roche, Oporto (PT); Mariana Ribeiro Dias, Oporto (PT)

(73) Assignee: Didimo, Inc., Oporto (PT)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,418

(22) Filed: Sep. 29, 2020

(65) Prior Publication Data

US 2021/0012550 A1  Jan. 14, 2021

Related U.S. Application Data

(63) Continuation-in-part of application No. 15/905,667, filed on Feb. 26, 2018, now Pat. No. 10,796,468.

(51) Int. Cl.
*G06T 13/40* (2011.01)
*G06T 17/20* (2006.01)
*G06V 40/16* (2022.01)

(52) U.S. Cl.
CPC .............. *G06T 13/40* (2013.01); *G06T 17/20* (2013.01); *G06V 40/168* (2022.01); *G06V 40/174* (2022.01)

(58) Field of Classification Search
CPC ......... G06T 13/00; G06T 13/20; G06T 13/40; G06T 15/205; G06T 2207/30201; G06K 9/00221–00315; G06K 2009/00328
See application file for complete search history.

(56) References Cited

U.S. PATENT DOCUMENTS

| 6,272,231 B1 | 8/2001 | Maurer et al. |
| 10,379,719 B2 | 8/2019 | Scapel et al. |

(Continued)

FOREIGN PATENT DOCUMENTS

| EP | 3759692 A1 | 1/2021 |
| WO | WO2019162420 A1 | 8/2019 |

(Continued)

OTHER PUBLICATIONS

Li H, Yu J, Ye Y, Bregler C. Realtime facial animation with on-the-fly correctives. ACM Trans. Graph.. Jul. 1, 2013;32(4):42-1. (Year: 2013).*

(Continued)

*Primary Examiner* — Diane M Wills
(74) *Attorney, Agent, or Firm* — Carr & Ferrell LLP

(57) ABSTRACT

The disclosure provides methods and systems for automatically generating an animatable object, such as a 3D model. In particular, the present technology provides fast, easy, and automatic animatable solutions based on unique facial characteristics of user input. Various embodiments of the present technology include receiving user input, such as a two-dimensional image or three-dimensional scan of a user's face, and automatically detecting one or more features. The methods and systems may further include deforming a template geometry and a template control structure based on the one or more detected features to automatically generate a custom geometry and custom control structure, respectively. A texture of the received user input may also be transferred to the custom geometry. The animatable object (Continued)

therefore includes the custom geometry, the transferred texture, and the custom control structure, which follow a morphology of the face.

10 Claims, 12 Drawing Sheets

(56) References Cited

U.S. PATENT DOCUMENTS

| | | | |
|---|---|---|---|
| 10,796,468 | B2 | 10/2020 | Orvalho et al. |
| 11,062,494 | B2 | 7/2021 | Orvalho et al. |
| 11,182,945 | B2 | 11/2021 | Orvalho et al. |
| 2003/0137515 | A1 | 7/2003 | Cederwall et al. |
| 2005/0187806 | A1 | 8/2005 | Wurtzel et al. |
| 2009/0055190 | A1 | 2/2009 | Filev et al. |
| 2009/0135176 | A1 | 5/2009 | Snoddy et al. |
| 2010/0007665 | A1 | 1/2010 | Smith et al. |
| 2010/0149177 | A1 | 6/2010 | Miller |
| 2011/0175921 | A1 | 7/2011 | Havaldar et al. |
| 2011/0267344 | A1 | 11/2011 | Germann et al. |
| 2012/0323581 | A1* | 12/2012 | Strietzel .................. G06T 13/40 704/276 |
| 2014/0043329 | A1 | 2/2014 | Wang et al. |
| 2014/0085293 | A1 | 3/2014 | Konoplev et al. |
| 2014/0160123 | A1* | 6/2014 | Yang ........................ G06T 17/00 345/420 |
| 2015/0215249 | A1 | 7/2015 | Bruns-Bielkowicz et al. |
| 2015/0287403 | A1 | 10/2015 | Holzer Zaslansky et al. |
| 2016/0088284 | A1 | 3/2016 | Sareen et al. |
| 2016/0148435 | A1 | 5/2016 | Li et al. |
| 2017/0053663 | A1 | 2/2017 | Yu et al. |
| 2017/0365231 | A1 | 12/2017 | Rider et al. |
| 2017/0372505 | A1 | 12/2017 | Bhat et al. |
| 2018/0018787 | A1 | 1/2018 | Giancola et al. |
| 2018/0054466 | A1 | 2/2018 | Blattner et al. |
| 2018/0139436 | A1 | 5/2018 | Yucer et al. |
| 2018/0336737 | A1 | 11/2018 | Varady et al. |
| 2019/0035131 | A1 | 1/2019 | Hutchinson et al. |
| 2019/0035149 | A1 | 1/2019 | Chen et al. |
| 2019/0266773 | A1 | 8/2019 | Orvalho et al. |
| 2019/0279410 | A1 | 9/2019 | Orvalho et al. |
| 2020/0265611 | A1 | 8/2020 | Hemmer et al. |
| 2021/0065420 | A1 | 3/2021 | Orvalho et al. |
| 2021/0328954 | A1 | 10/2021 | Orvalho et al. |
| 2021/0358189 | A1 | 11/2021 | Orvalho et al. |

FOREIGN PATENT DOCUMENTS

| | | |
|---|---|---|
| WO | WO2019173108 A1 | 9/2019 |
| WO | WO2021040896 A1 | 3/2021 |

OTHER PUBLICATIONS

Loconsole C, Miranda CR, Augusto G, Frisoli A, Orvalho V. Real-time emotion recognition novel method for geometrical facial features extraction. In2014 International Conference on Computer Vision Theory and Applications (VISAPP) Jan. 5, 2014 (vol. 1, pp. 378-385). IEEE. (Year: 2014).*

Malciu, Marius, and Francoise J. Preteux. "Tracking facial features in video sequences using a deformable-model-based approach." Mathematical Modeling, Estimation, and Imaging. vol. 4121. International Society for Optics and Photonics, 2000. (Year: 2014).*

Orvalho et al., "A Facial Rigging Survey", Eurographics: STAR—State of The Art Report, 2012, 22 pages.

Ichim et al., "Dynamic 3D Avatar Creation from Hand-help Video Input", ACM Transactions on Graphics, Jul. 27, 2015, 14 pages.

"Invitation to Pay Additional Fees", Patent Cooperation Treaty Application No. PCT/EP2019/054390, Mar. 27, 2019, 17 pages.

Dutreve et al., "Easy rigging of face by automatic registration and transfer of skinning parameters", Inernational Conference on Computer Vision and Graphics, Apr. 3, 2017, 9 pages.

"International Search Report" and "Written Opinion of the International Searching Authority," Patent Cooperation Treaty Application No. PCT/US2019/020140, dated May 17, 2019, 8 pages.

"International Search Report" and "Written Opinion of the International Searching Authority," Patent Cooperation Treaty Application No. PCT/EP2019/054390, dated May 22, 2019, 17 pages.

"Category:Line drawings of facial expressions", Wikimedia Commons, Retrieved from "https://commons.wikimedia.org/w/index.php?title=Category:Line_drawings_of_facial_expressions&oldid= 329552043", Nov. 27, 2018, 11 pages.

"Morph target animation." Wikipedia, Retrieved from "https://en.wikipedia.org/wiki/Morph_target_animation", Aug. 29, 2019.

"International Search Report" and "Written Opinion of the International Searching Authority," Patent Cooperation Treaty Application No. PCT/US2020/041674, dated Nov. 3, 2020, 10 pages.

Orvalho et al., "Advanced Electronic Messaging Utilizing Animatable 3D Models", U.S. Appl. No. 17/361,100, filed Jun. 28, 2021, 55 pages.

"Office Action", Canada Patent Application No. 3090747, dated Aug. 19, 2021, 4 pages.

* cited by examiner

ADDITIONAL DEVELOPMENTS TO THE AUTOMATIC RIG CREATION PROCESS

CROSS-REFERENCE TO RELATED APPLICATIONS

The present Continuation-in-Part application claims the priority benefit of U.S. Non-Provisional patent application Ser. No. 15/905,667 filed on Feb. 26, 2018 and titled "Automatic Rig Creation Process," the disclosure of which is incorporated by reference in its entirety.

FIELD

The present technology relates generally to animatable 3D models, and more particularly to systems and methods for automatically generating custom meshes and rigging for animatable 3D models.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

An animatable 3D model of a virtual character is a computer graphic representation having a geometry or mesh, which may be controlled by a rig or control structure. The rig or control structure attaches to areas of the mesh, and affects those areas of the mesh in accordance with geometric operations applied.

Conventionally, facial animation is done through motion capture and/or manually by skilled artists, who carefully manipulate animation controls to create the desired motion of the facial model. Even with the use of rigs or control structures, the particular process of manipulating the rigs to produce realistic and believable facial movements is difficult and dependent upon minute manipulation by animation experts. Since each face is unique, a mesh and rig of each 3D facial model must be individually customized for the particular desired facial structure.

Current processes for creating rigs for animation are time consuming, costly, and dependent upon subjective human involvement. As such, a long felt need exists for automatic and objective animatable solutions to create 3D objects including 3D facial models.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to some embodiments, the present disclosure is directed to a method for automatically generating an animatable object. The method may include receiving user input; automatically detecting one or more features of the received user input; deforming a template geometry based on the one or more detected features to automatically generate a custom geometry; transferring a texture of the received user input to the custom geometry; deforming a template control structure based on the one or more detected features to automatically generate a custom control structure; and generating an animatable object having the custom geometry, the transferred texture, and the custom control structure.

The present technology is also directed to systems for automatically generating an animatable object. In various embodiments, a system may include a processor and a memory for storing executable instructions, the processor executing the instructions to: receive user input indicative of a face; automatically detect one or more features of the received user input; deform a template geometry based on the one or more detected features to automatically generate a custom geometry; transfer a texture of the received user input to the custom geometry; deform a template control structure based on the one or more detected features to automatically generate a custom control structure; and generate an animatable object having the custom geometry, the transferred texture, and the custom control structure.

According to one or more exemplary embodiments, methods for automatically generating an animatable 3D model may include receiving user input; automatically detecting one or more features of the received user input; determining one or more first spatial coordinates, each first spatial coordinate associated with one of the one or more detected features; deforming a template geometry based on the one or more first spatial coordinates to automatically generate a custom geometry; transferring a texture of the received user input to the custom geometry; deforming a template control structure based on a subset of the one or more spatial coordinates to automatically generate a custom control structure; and generating an animatable 3D model having the custom geometry, the transferred texture, and the custom control structure.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example, and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

In general, various embodiments of the present disclosure are directed to fast, easy, and automatic animatable solutions for generating three-dimensional (3D) objects. For example, one or more embodiments include automatically generating a 3D model from a user input, such as a two-dimensional (2D) photograph or 3D scan data of a user's face. The 3D model may include a custom geometry (e.g. mesh), a texture, and a custom control structure (e.g. rig) based on the user input. These and other advantages of the present disclosure are provided herein in greater detail with reference to the drawings.

Figure 1:
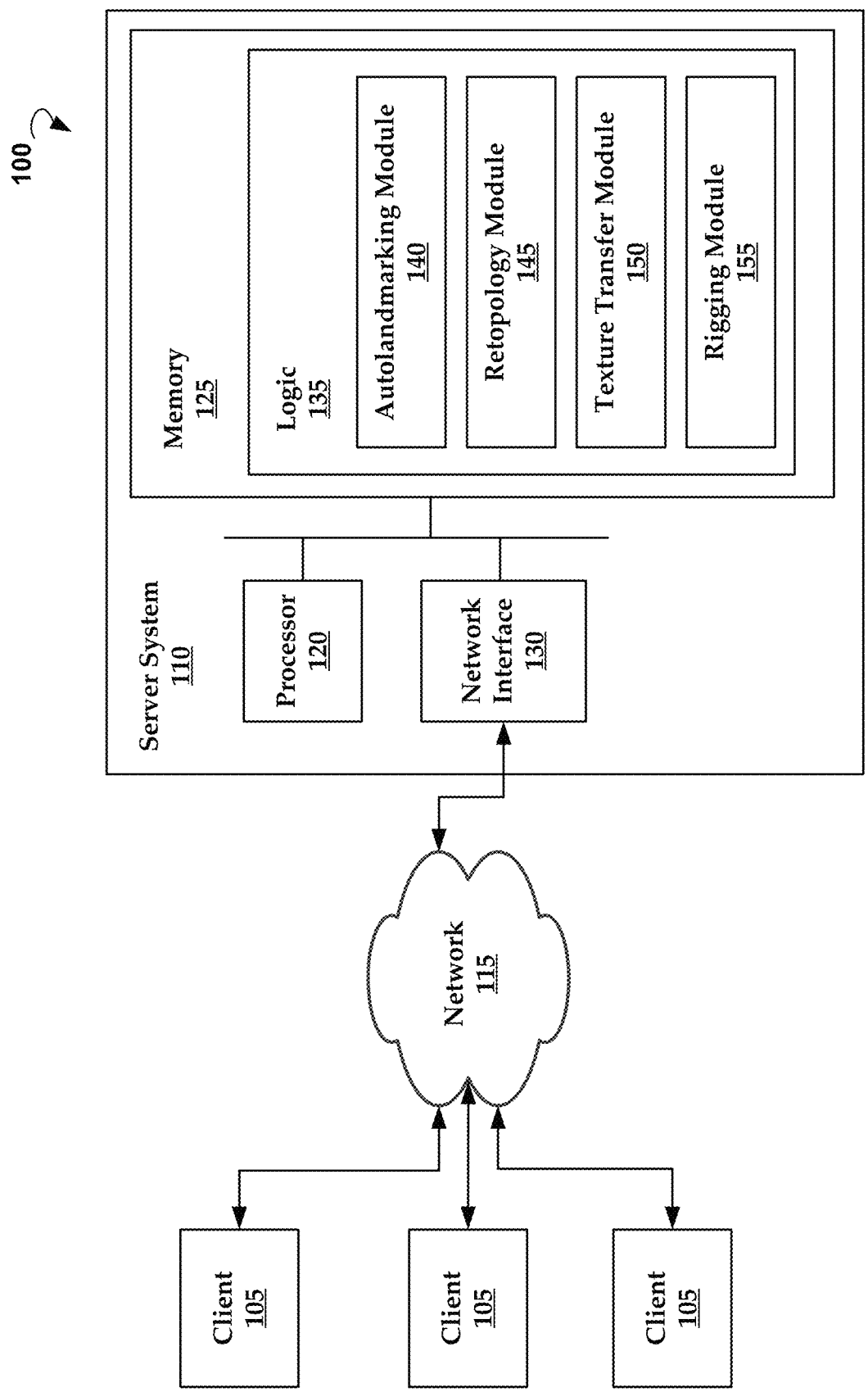
FIG. 1 is a schematic diagram of an example system architecture for practicing aspects of the present disclosure.

FIG. 1 illustrates an exemplary architecture 100 for practicing aspects of the present disclosure. The architecture comprises one or more clients 105 communicatively coupled to a server system 110 via a public or private network, such as network 115. In various embodiments, the client 105 includes at least one of a personal computer, a laptop, a Smartphone, or other suitable computing device.

Suitable networks for network 115 may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 115 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

Generally, the server system 110 is configured to provide various functionalities which are described in greater detail throughout the present disclosure. In various embodiments, the server system 110 comprises a processor 120, a memory 125, and network interface 130. According to some embodiments, the memory 125 comprises logic 135 (otherwise referred to as instructions) that may be executed by the processor 120 to perform various methods described herein. For example, the logic 135 may include autolandmarking module 140, retopology module 145, texture transfer module 150, and rigging module 155, which are configured to provide some or all of the functionalities described in greater detail herein. It is to be understood that, while the methods described herein are generally attributed to the server system 110, may also be executed by the client 105. In other embodiments, the server system 110 and client 105 may cooperate to provide the functionalities described herein. The client 105 may be provided with a client-side application that interacts with the server system 110 in a client/server relationship.

In general, the autolandmarking module 140 may receive user input, for example in the form of a 2D image or 3D data associated with a face or head of a person, from the client 105. The autolandmarking module 140 may automatically detect facial features (e.g. landmarks) from the user input, which are unique to the face associated with the user input. In various embodiments, the automatic detection of facial features is based on machine learning algorithms on an associated database. In some embodiments, the autolandmarking module 140 casts 2D coordinates of the detected facial features from a 2D input into 3D coordinates (e.g. spatial coordinates) associated with a template geometry.

In one or more embodiments, the retopology module 145 automatically deforms, based on the detected facial features, the template geometry to create a custom geometry. The template geometry may have a pre-defined set of facial features with associated coordinates. In general, vertices of the custom geometry follow a morphology of the original face associated with the user input.

In some embodiments, the texture transfer module 150 determines a texture from the user input. In general, the texture transfer module 150 uses the user input as the texture, such as the 2D image or surface information of 3D input data. The texture transfer module 150 may match the texture to the custom geometry created by the retopology module. In general, the texture is not modified—for example, no resampling is performed and no average is performed of the deformed space in any database. Advantageously, the custom geometry has already been deformed to match the texture given in the user input. The texture transfer module 150 may automatically map the texture to the custom geometry by associating each pixel in the user input to a corresponding vertex or surface on the custom geometry. Moreover, the transferred texture is configured to adapt to an environment of the 3D model, for example, to adjust for illumination and context.

In various embodiments, the rigging module 155 automatically generates a custom control structure based on the detected facial features. The control structure generally provides elements that allow manipulation of the custom geometry to create animation. The control structure may adapt and create key elements to deform the custom geometry during animation such that behaviors and movements are smooth and follow the morphology of the face associated with the user input. In particular, in some embodiments, the rigging module 155 deforms a template control structure based on control elements determined from the detected facial features. In general, the texture transfer module 150 and the rigging module 155 may operate in series or in parallel.

The server system 110 may then combine the custom geometry, the transferred texture, and the custom control structure to automatically generate the animatable 3D model. Thus, the final output may include accurate landmark detection, an accurate custom geometry that follows a morphology of the face associated with the user input, accurate texture mapping, and a custom control structure that allows smooth and accurate simulation of behavior and movement of the 3D model.

Another aspect of the present disclosure is that the server system 110 may utilize any template, or pre-defined, geometry and any template, or pre-defined, control structure. For example, the user may input, via the client 105, a user-defined geometry, which includes a pre-defined set of facial features with associated coordinates, to replace the template geometry in the server system 110. Likewise, the user may input, via the client 105, a user-defined control structure to replace the template control structure used by the rigging module 155 to generate the custom control structure.

Figure 2:
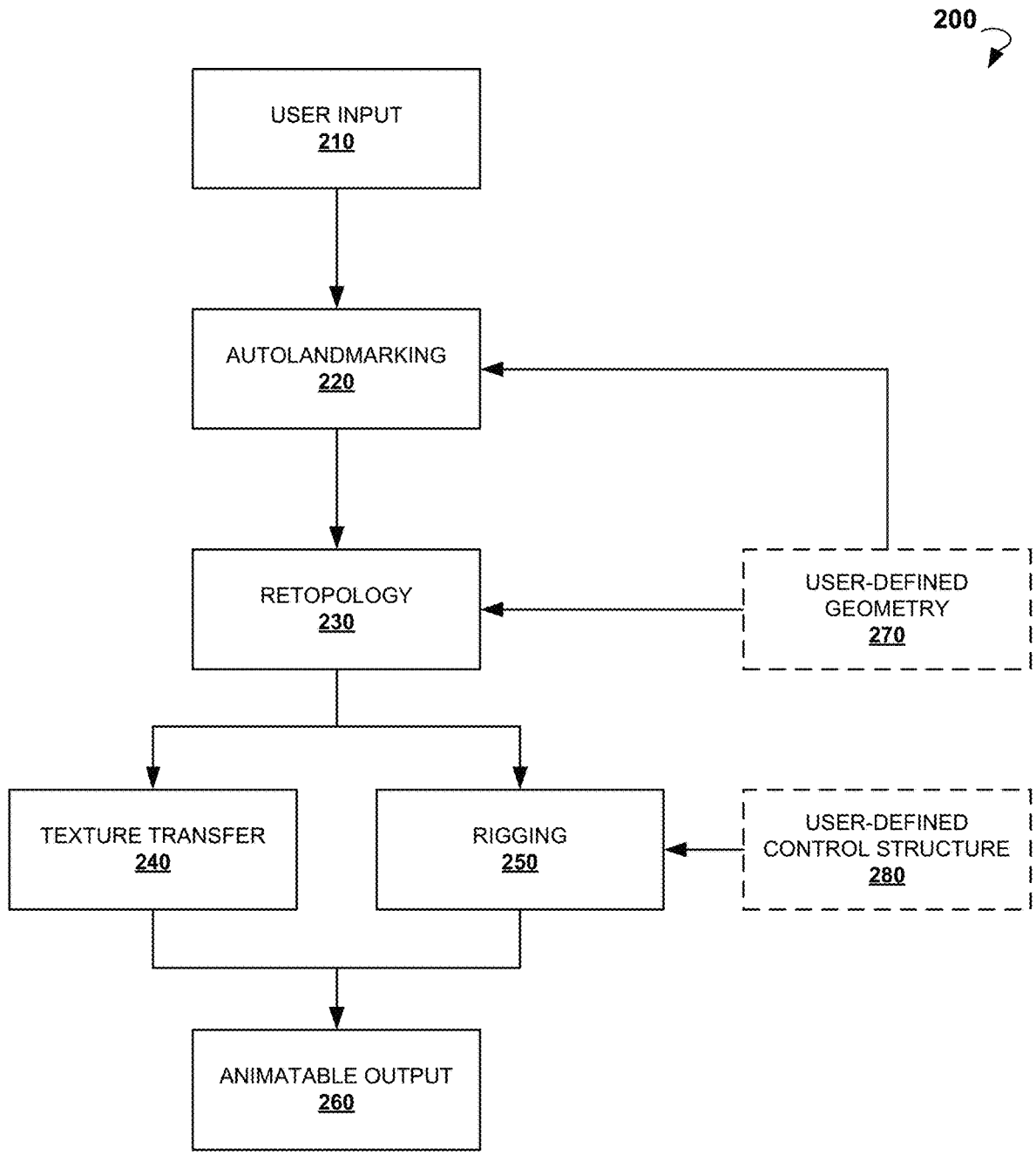
FIG. 2 is a block diagram for automatically generating an animatable object, according to embodiments of the present disclosure.

FIG. 2 depicts a block diagram of a system 200 for automatically generating a custom animatable object, according to embodiments of the present disclosure.

At block 210, user input is received that is indicative of a face of the user. The user input may be an image, a frame of a video, a 3D scan, or other suitable media. It is to be understood that the user input may further comprise body information of the user. In such embodiments, the template geometry and template control structure would comprise approximations of the appearance and control elements of a humanoid body, and the one or more features detected by autolandmarking would include further features indicative of the body.

At block 220, autolandmarking is performed to automatically detect facial features from the user input from block 210. The facial features are unique to the user. If the user input is an image or in another 2D format, the facial features are detected and stored as 2D coordinates, for example those shown and described in FIG. 4. The 2D coordinates are converted into spatial coordinates using ray casting techniques, or other suitable algorithms. For example, the system 200 may include creating an artificial 2D plane, having the user input and detected features, in front of a template 3D model. It is to be understood that the template 3D model may include a template, or generic, geometry and template, or generic, control structure. An origin coordinate is determined based on a spatial position of the user input and the template 3D model. Using ray casting techniques, each detected feature is projected from the artificial 2D plane onto the template 3D model via a ray passing from the origin through the respective 2D coordinate of the detected feature. The projection results in a spatial coordinate indicative of where the detected feature should be for the custom animatable model. The depth of each spatial coordinate, as well as the relative position of the artificial 2D plane, template 3D model, and origin coordinate, may be automatically determined based on predictions and statistics of facial morphology. In other embodiments, the depth of each spatial coordinate is pre-defined in the template geometry.

In various embodiments, the server comprises a template 3D model having a template geometry and a template control structure, also referred to as a pre-defined geometry and a pre-defined control structure, respectively. The template geometry is an approximation of what the resulting facial mesh should look like, although it is to be understood that the template geometry may be any suitable size or shape. The template control structure may be any suitable rig for controlling movement of a geometry, such as a bone-based rig, blend-shape rig, free-form deformer, physically-based model, or other suitable control structure. For example, the template control structure may comprise a pre-defined set of bones that will create facial movements that follow the morphology and behavior a face of the template geometry.

At block 230, retopology is performed to deform the template geometry based on the detected facial features. The template geometry may include a set of template facial features that correspond to facial features detected in the autolandmarking in block 220. As such, spatial coordinates of the detected facial features are matched to corresponding spatial coordinates of the template facial features. Based on the matching, the template geometry is automatically deformed to create a custom geometry using radial basis functions, or other suitable algorithms. Advantageously, the custom geometry is clean. That is, vertices of the custom geometry follow a morphology of the face from the user input.

In some embodiments, block 230 includes dynamically deforming the template geometry based on a determined type of facial structure associated with the user input. For example, the server may comprise a plurality of template geometries, each template geometry corresponding to a different type of facial structure. The different types of facial structures may relate to different genders or races, for example, and reflect differences in statistical information regarding the facial morphologies of each group. As such, each template geometry may comprise different spatial coordinates for the set of generic facial features. Block 230 may further include determining which template geometry of the plurality of template geometries most closely matches the one or more detected features of the received user input, and using that template geometry.

Likewise, the server may comprise a plurality of template models, each with different parameters for different target applications. For example, a first template model of the template models may be configured with a cinematic rig with a large number of control points and high polygon count, while a second template model of the template models may be configured for a lightweight, non-playable character in a video game with a few control points and a low polygon count. The server may select which template model to use based on user input or automatically.

Block 240 and block 250 may be performed in series or in parallel, as shown in FIG. 2. At block 240, a texture of the user input is transferred to the custom geometry automatically generated in block 230. Transferring the texture may include mapping a plurality of pixels of the user input to vertices of the custom geometry. At block 250, rigging is performed to automatically generate a custom control structure based on the detected facial features and the template control structure. The template control structure may include a pre-defined set of control elements, such as bones in a bone-based rig, associated with spatial coordinates. A subset of the detected facial features may be associated with control elements, herein after referred to as detected control elements of the user input. As such, spatial coordinates of the detected control elements are matched to corresponding spatial coordinates of the template control structure. Based on the matching, the template control structure is automatically deformed to create a custom control structure using radial basis functions, or other suitable algorithms. Advantageously, one or more algorithms used to deform the template control structure may be the same as the one or more algorithms used to deform the template geometry. The custom control structure provides the elements to allow for the manipulation and animation of the custom geometry, and is configured to follow the morphology of the face from the user input.

At block 260, an animatable output is automatically generated from the custom geometry, the transferred texture, and the custom control structure from blocks 230, 240, and 250. Thus the animatable object comprises a deformable, custom geometry that uses a custom control structure to generate behaviors and movement. The custom geometry, the transferred texture, and the custom control structure are all based on the user input, and thus are personalized to the unique face of the user indicative of the user input. For example, the animatable object may be a 3D model of a humanoid head having the face and morphology of the user. It is to be understood that the same methods may be applied to other physical structures, such as a body of the user. In such embodiments, the template geometry and template control structure would comprise approximations of the appearance and control elements of a humanoid body, and the feature detected by autolandmarking would include further features indicative of the body.

Advantageously, embodiments of the present disclosure are versatile and allow the user to input a user-defined template geometry and/or a user-defined template control structure, which are then used in the automatic system. If the user wants a mesh with fewer polygons or would like a control structure set up for motion capture instead of keyframe animation, for example, the user may input such a template geometry or template control structure into the system.

At optional block 270, a user-defined geometry is received. The server may store the user-defined geometry and associate the user-defined geometry with the user for future use. At block 230, the system may determine whether a user-defined geometry is stored for the user. Based on the determination, the user-defined geometry is deformed instead of the template geometry using the same methodology. In various embodiments, the system determines whether the user-defined geometry comprises the same features as the template geometry. Based on the determination, the system may dynamically and automatically adjust the features detected during autolandmarking in block 220, such that the detected features correspond to the features present in the user-defined geometry.

At optional block 280, a user-defined control structure is received. The user-defined control structure may be configured to control the behavior and movement of the user-defined geometry. The server may store the user-defined control structure and associate the user-defined control structure with the user for future use. At block 250, the system may determine whether a user-defined control structure is stored for the user. Based on the determination, rigging is performed to deform the user-defined control structure instead of the template control structure using the same methodology.

In one or more embodiments, the animatable object is dynamically and automatically generated in real-time based on a dynamic user input, for example from a video signal from a camera system. In such embodiments, the system would perform the autolandmarking, retopology, texture transfer, and rigging steps in real-time to dynamically and automatically generate the custom geometry, transferred texture, and custom control structure. For example, the system may capture features of the user via autolandmarking of the dynamic user input, and map the features to both the custom geometry and the custom control structure to create the animated 3D model. Control elements of the custom control structure are configured to allow the 3D model to move according to the morphology of the user. Real-time mapping of the features to the control structure allow for smooth manipulation of the custom geometry in real-time.

Figure 3:
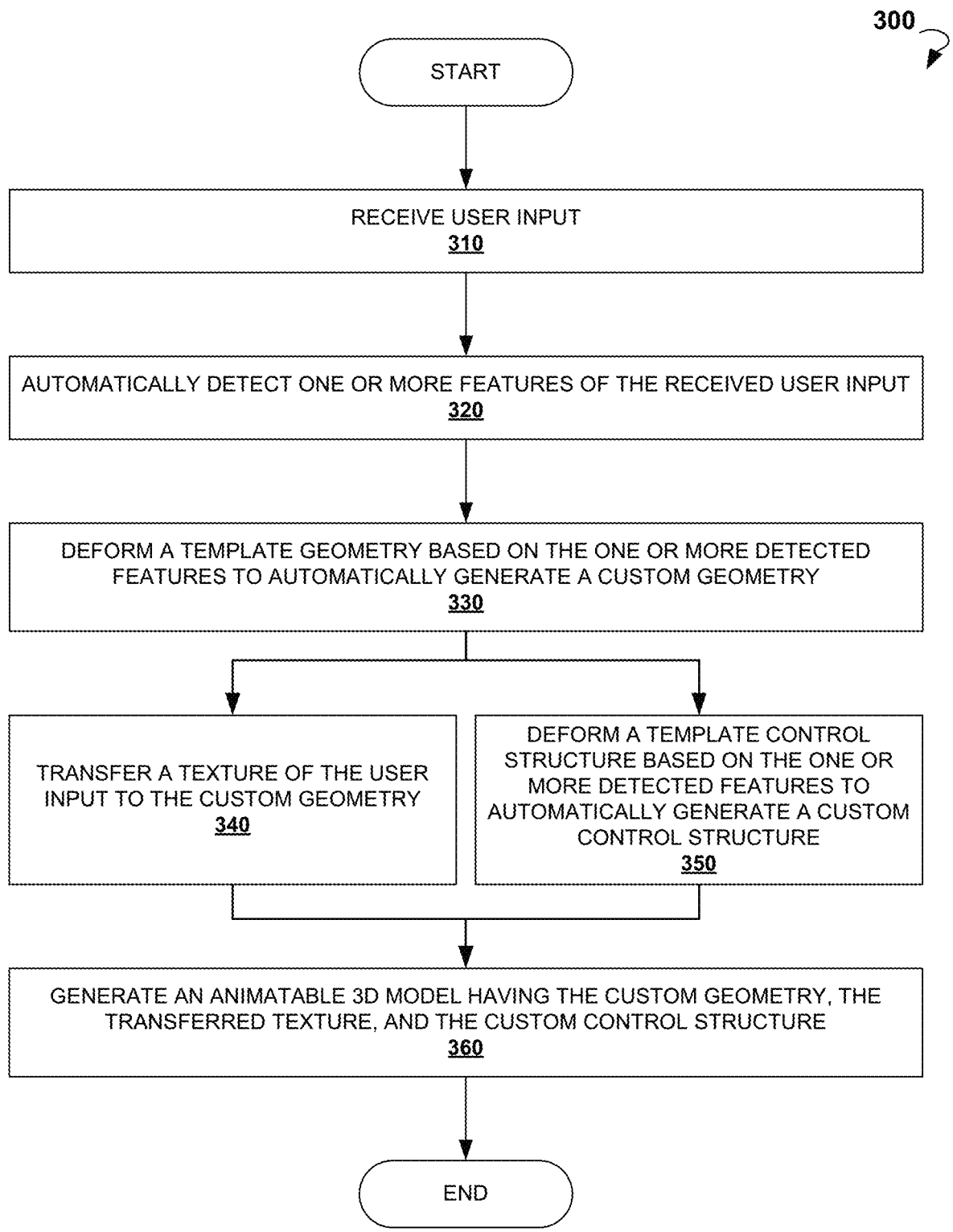
FIG. 3 is a flowchart of an example method for automatically generating an animatable object, according to embodiments of the present disclosure.

FIG. 3 is a flow chart showing an exemplary method 300 for automatic generation of an animatable object. Method 300 can be performed by processing logic that includes hardware (e.g. decision-making logic, dedicated logic, programmable logic, application-specific integrated circuit), software (such as software run on a general-purpose computer system or dedicated machine), or a combination of both. In one example embodiment, the processing logic refers to one or more elements the systems shown in FIGS. 1-2.

Operations of method 300 recited below can be implemented in an order different than described and shown in FIG. 3. Moreover, the method 300 may have additional operations not shown herein, but which can be evident to those skilled in the art from the present disclosure. Method 300 may also have fewer operations than shown in FIG. 3 and described below.

The method 300 may commence in operation 310 with receiving user input indicative of a face. In various embodiments, the user input includes at least one of an image, a video signal, and a 3D scan, which may be indicative of a face and/or body of a user. In certain embodiments, the user input is received from a client device via a network. It is to be understood that each operation of the method 300 may be performed in real-time, such that a dynamic user input such as a video signal is permitted to be input to automatically generate a dynamic 3D model that follows a morphology of the user input in real-time.

Operation 320 includes automatically detecting one or more features of the received user input. The automatically detecting the one or more features may include determining a set of spatial coordinates via ray casting techniques, each spatial coordinate associated with one of the one or more features of the received user input. In one or more embodiments, operation 320 includes casting a two-dimensional coordinate of each of the one or more detected features onto a template geometry using the ray casting techniques.

The method 300 may proceed in operation 330 with deforming a template geometry based on the one or more detected features to automatically generate a custom geometry. In some embodiments, a set of features of the template geometry corresponds to the one or more detected features. The deforming the template geometry may include matching the spatial coordinates of the one or more detected features to the set of features of the template geometry, and based on the matching, applying a radial basis function to the spatial coordinates of the one or more detected features and the set of features of the template geometry. The application of the radial basis function may produce vertices of the custom geometry which are based on the spatial coordinates of the one or more detected facial features.

In certain embodiments, the template geometry is a user-defined geometry received from a client device. The method 300 may further include storing the user-defined geometry as being associated with the client device.

Operation 340 and operation 350 may be performed in parallel, as shown in FIG. 3. Operation 340 may include transferring a texture of the received user input to the custom geometry. In certain embodiments, the transferring the texture to the custom geometry includes automatically mapping at least one pixel of the texture to a corresponding vertex on the custom geometry.

In various embodiments, operation 350 includes deforming a template control structure based on the one or more detected features to automatically generate a custom control structure. A set of control elements of the template control structure may correspond to a subset of the one or more detected features. The deforming the template control structure may include matching the subset of the one or more detected features to the set of control elements of the template control structure, and based on the matching, applying a radial basis function to the subset of the one or more detected features and the set of control elements. The application of the radial basis function may produce control elements of the custom control structure which are based on spatial coordinates of the subset of the one or more detected facial features.

In certain embodiments, the template control structure is a user-defined control structure received from a client device. The method 300 may further include storing the user-defined control structure as being associated with the client device.

At operation 360, an animatable object is automatically generated having the custom geometry, the transferred texture, and the custom control structure.

Figure 4:
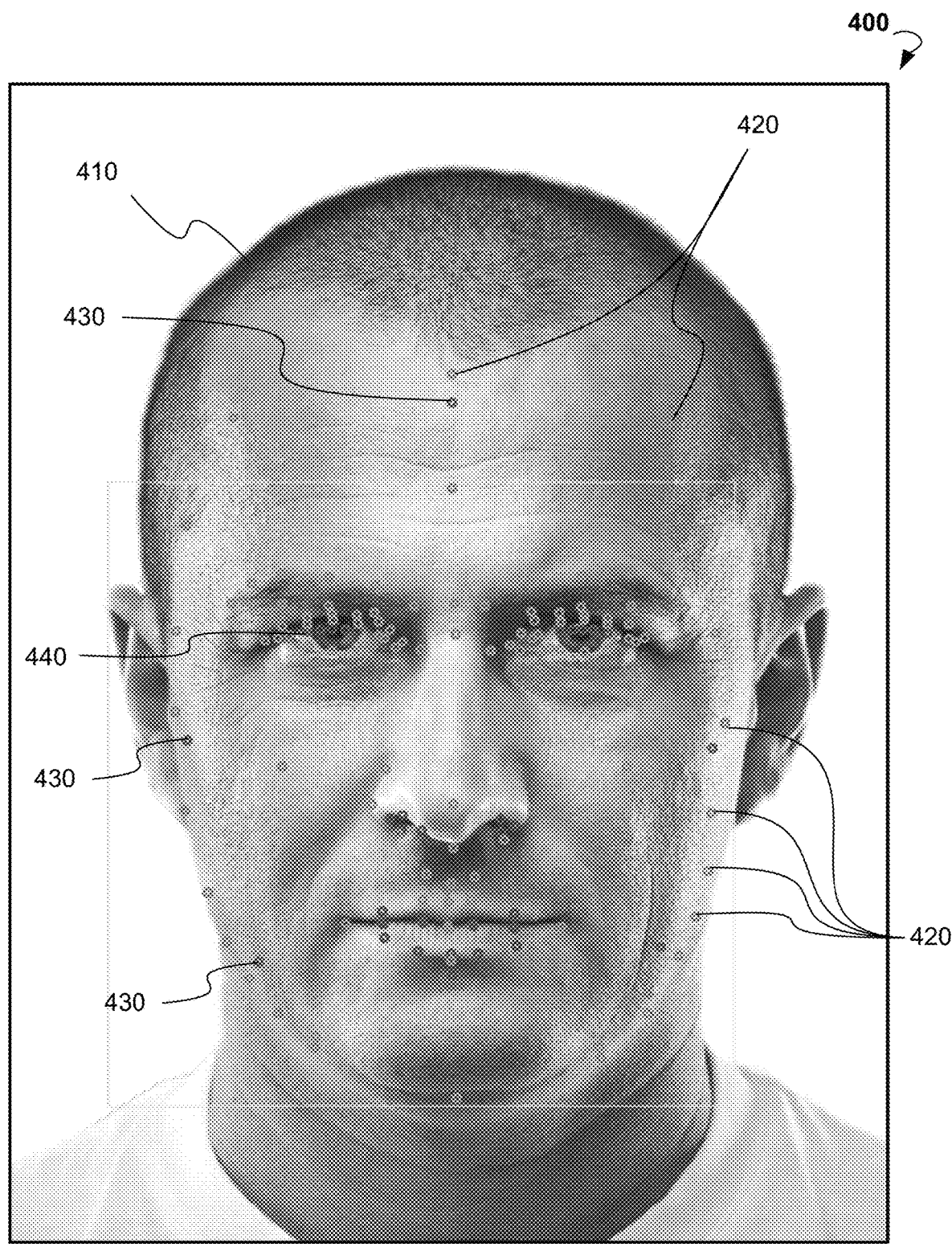
FIG. 4 is an example user input having one or more facial features detected via autolandmarking.

FIG. 4 is screenshot of an example user input 400 indicative of a user's face 410 having one or more facial features 420, 430, 440 detected via autolandmarking. Each of the one or more detected facial features 420, 430, 440 is represented by a circle over the user input 400, though for ease of illustration only some of the one or more detected facial features 420, 430, 440 are marked with a reference number. The one or more detected facial features 420, 430, 440 may be described as a set of rules which control the automatic generation of the custom geometry and custom control structure and configure the resulting animatable 3D model to follow the morphology of the face 410. In one or more embodiments, a first set of facial features 420 may be used in the deformation of the template geometry to the custom geometry. A second set of facial features 430 may facilitate alignment and scale, while a third set of facial features 440 may be used to determine coloring (e.g. eye coloring). In such an example, the set of facial features for only one eye may be necessary to determine the eye color. It is to be understood that the identification of any particular detected facial feature 420, 430, 440 in FIG. 4 is exemplary and different combinations of detected facial features, and designation of the type of detected facial features, are contemplated by the present disclosure.

Figure 5:
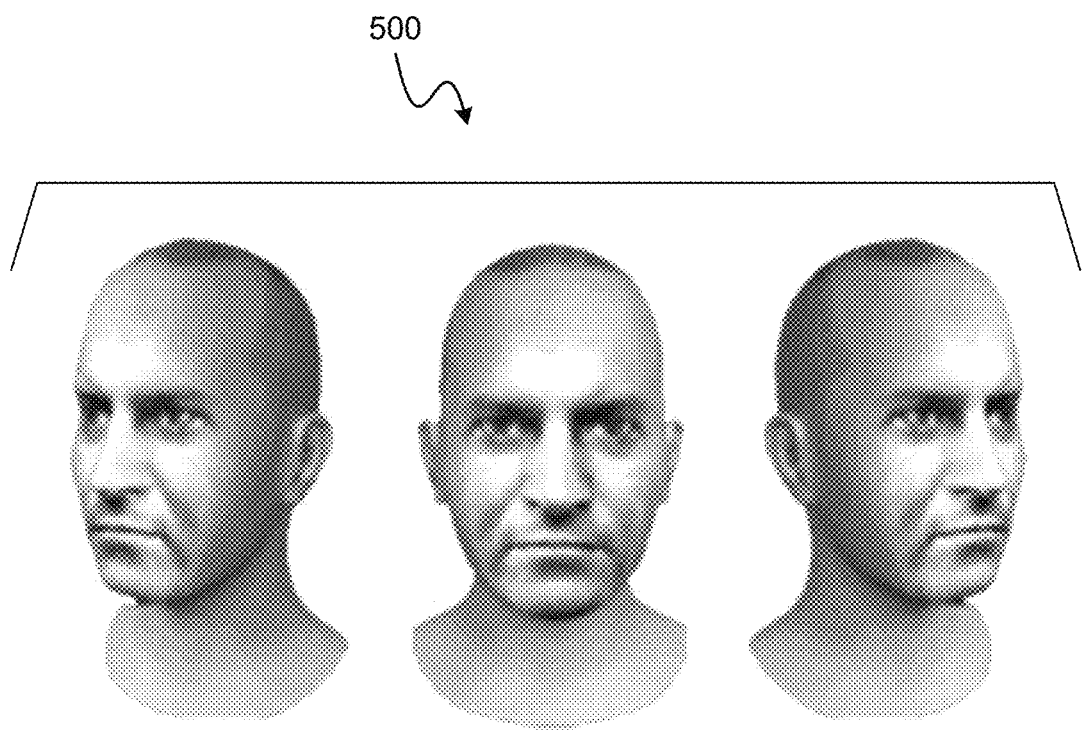
FIG. 5 is a rendering of an exemplary animatable 3D model created from the example user input of FIG. 4.
Figure 6:
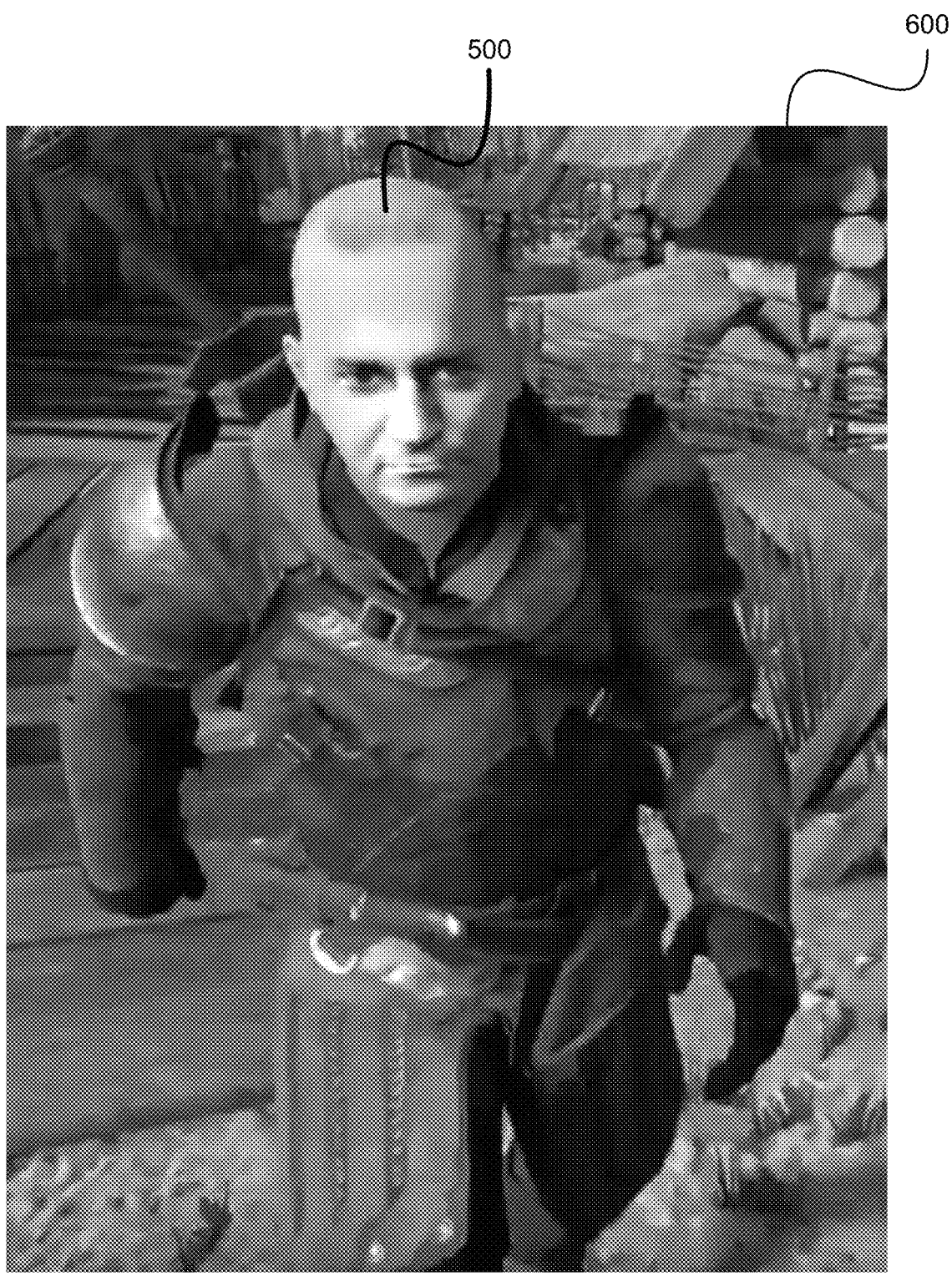
FIG. 6 is a real-time rendering of the animatable 3D model of FIG. 5 in a virtual gaming environment.

FIGS. 5 and 6 illustrate exemplary animatable objects created from the methods described in the present disclosure. FIG. 5 is a rendering of an exemplary animatable 3D model 500 created from the example user input 400 of FIG. 4. Moreover, FIG. 6 depicts a real-time rendering of an animatable 3D model 500 of FIG. 5 in a virtual gaming environment 600.

Figure 7:
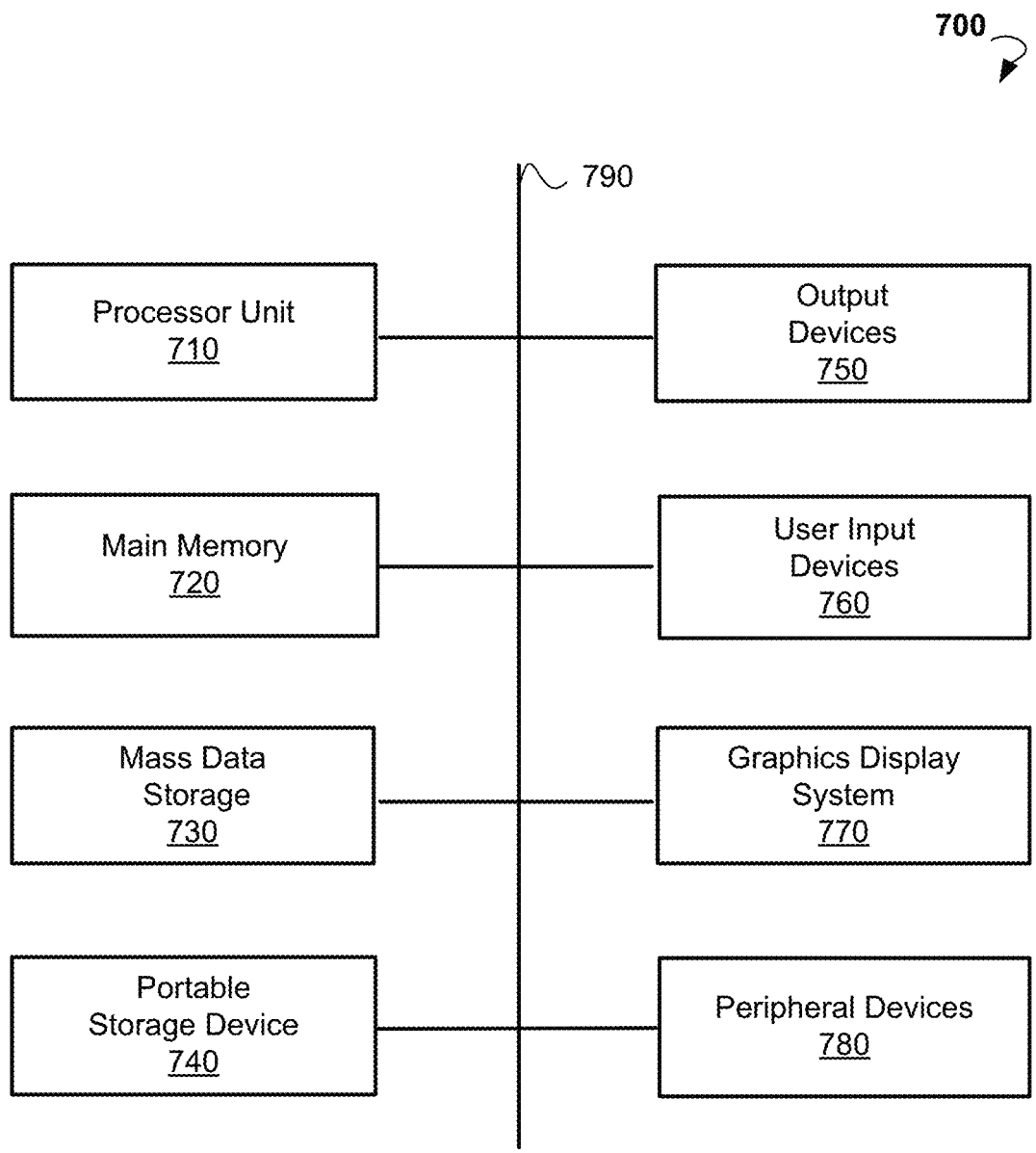
FIG. 7 is a schematic diagram of an example computer device that can be utilized to implement aspects of the present disclosure.

FIG. 7 illustrates an exemplary computer system 700 that may be used to implement some embodiments of the present technology. Computer system 700 may be implemented in the contexts of the likes of computing systems such as server system 110 and client 107. Computer system 700 includes one or more processor units 710 and main memory 720. Main memory 720 stores, in part, instructions and data for execution by processor units 710. Main memory 720 stores the executable code when in operation, in this example. Computer system 700 may further include one or more of a mass data storage 730, portable storage device 740, output devices 750, user input devices 760, a graphics display system 770, and peripheral devices 780.

The components shown in FIG. 7 are depicted as being connected via a single bus 790. The components may be connected through one or more data transport means. Processor unit 710 and main memory 720 is connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or USB storage device, to input and output data and code to and from computer system 700. The system software for implementing embodiments of the present disclosure is stored on such a portable medium and input to computer system 700 via portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, computer system 700 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device. Peripheral devices 780 may include any type of computer support device to add additional functionality to the computer system.

The components provided in computer system 700 are those typically found in computer systems that may be suitable for use with embodiments of the present disclosure and are intended to represent a broad category of such computer components that are well known in the art. Thus, computer system 700 can be a personal computer (PC), hand held computer system, telephone, mobile computer system, workstation, tablet computer, mobile phone, server, minicomputer, mainframe computer, wearable computer, or any other computing system. The computer may also include different bus configurations, networked platforms, multi-processor platforms, and the like.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, computer system 700 may be implemented as a cloud-based computing environment, such as a virtual machine operating within a computing cloud. In other embodiments, computer system 700 may itself include a cloud-based computing environment, where the functionalities of the computer system 700 are executed in a distributed fashion. Thus, computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as computer system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Figure 8:
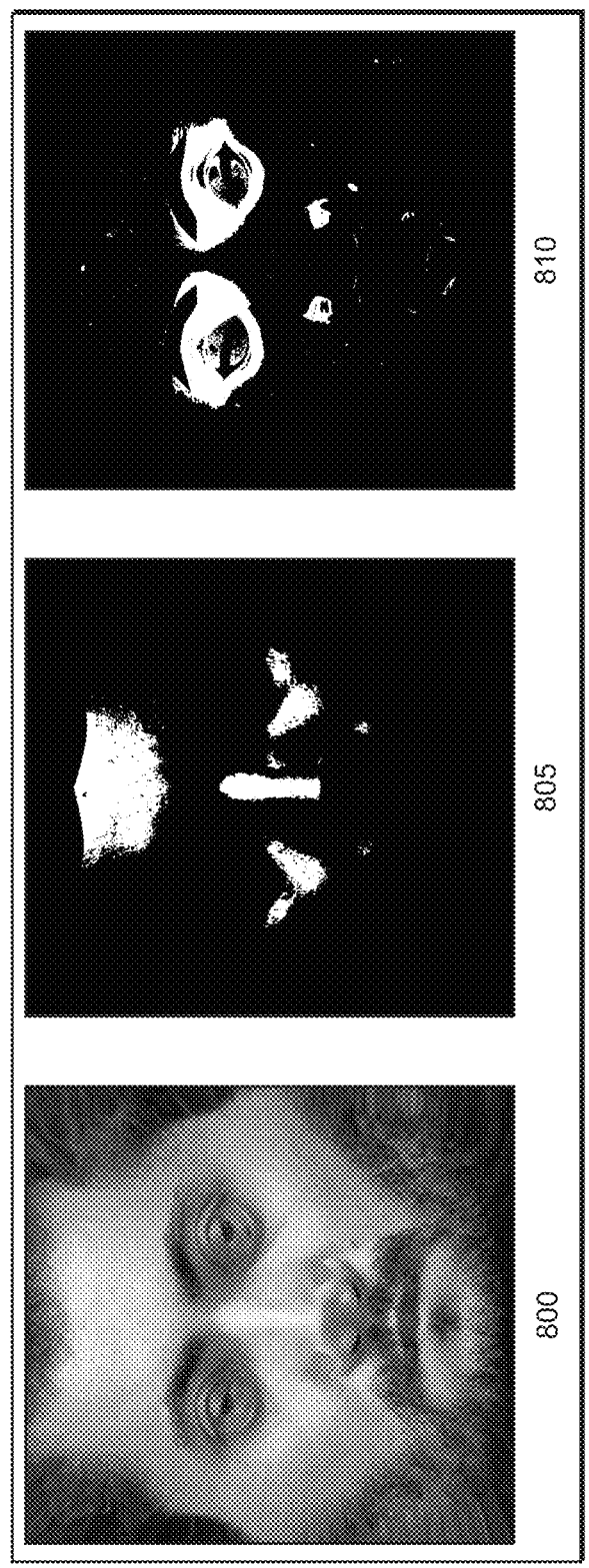
FIG. 8 shows a light non-uniformity detection example.

FIG. 8 shows a light non-uniformity detection example.

According to various exemplary embodiments, a three-dimensional ("3D") facial reconstruction pipeline comprises a light correction component composed of a set of automated methods that perform detection and correction of light artifacts on an input image. The input image is usually a facial texture in the UV space and the component operates upon the skin pixels in the image. As such, the component also operates on skin and hair masks of the input facial texture in the UV space. The letters "U" and "V" denote the axes of the 2D texture because "X", "Y", and "Z" are already used to denote the axes of the 3D object in model space. The exemplary methods also work if the images are not in UV space.

In the detection stage, the exemplary methods perform detection of shadows and specular artifacts independently and using traditional computer vision techniques based on statistical analysis. FIG. 8 shows the specular mask 805 and shadow mask 810 produced in the detection stage for the region of interest ("ROI") of a specific input image 800.

Figure 9:
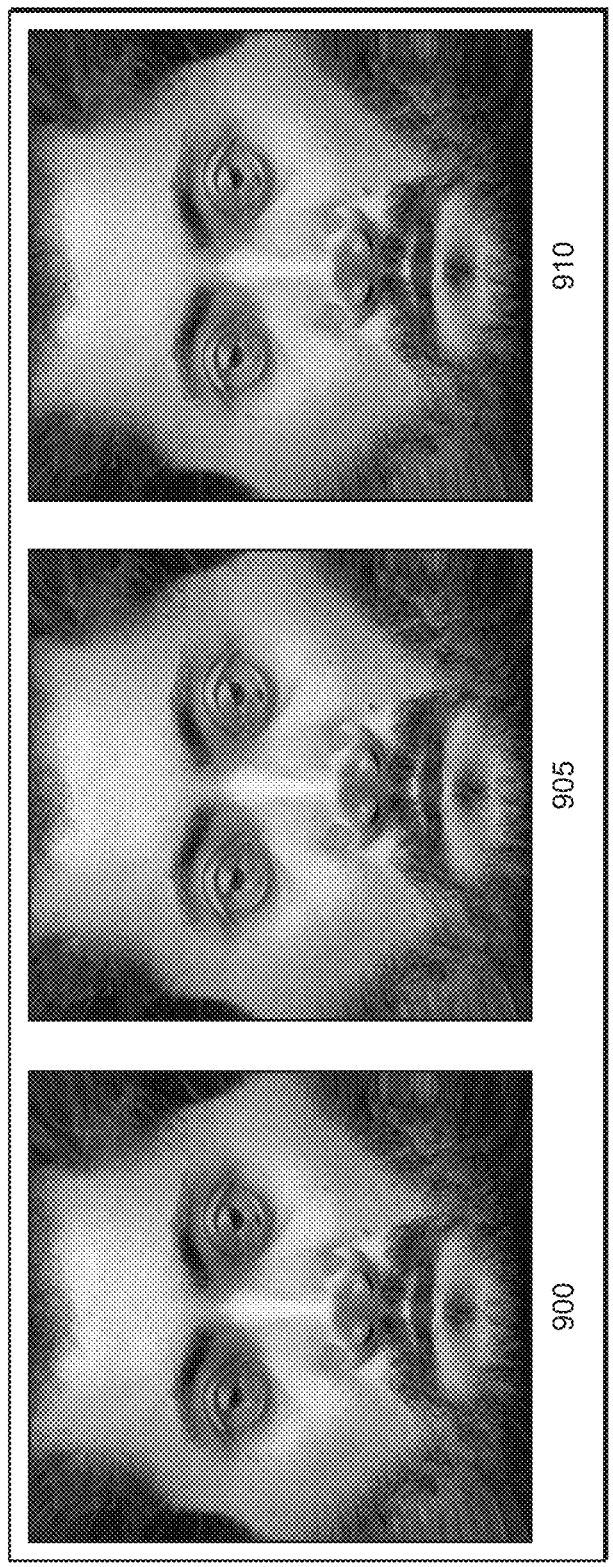
FIG. 9 shows an example of shadow correction and specular correction.

FIG. 9 shows an example of shadow correction and specular correction.

In the correction stage, exemplary methods perform brightness correction and color adjustment based on the average color of the skin pixels which are not affected by light artifacts. The two corrections are applied sequentially. The hair mask is used in this phase to ensure that hair pixels do not interfere in the selection of "clean" skin pixels. This stage also relies on traditional statistic-based computer vision techniques. FIG. 9 shows the ROI of an inputted face image 900, the image 905 after shadow correction, and the image 910 after the specular reflection correction.

Figure 10:
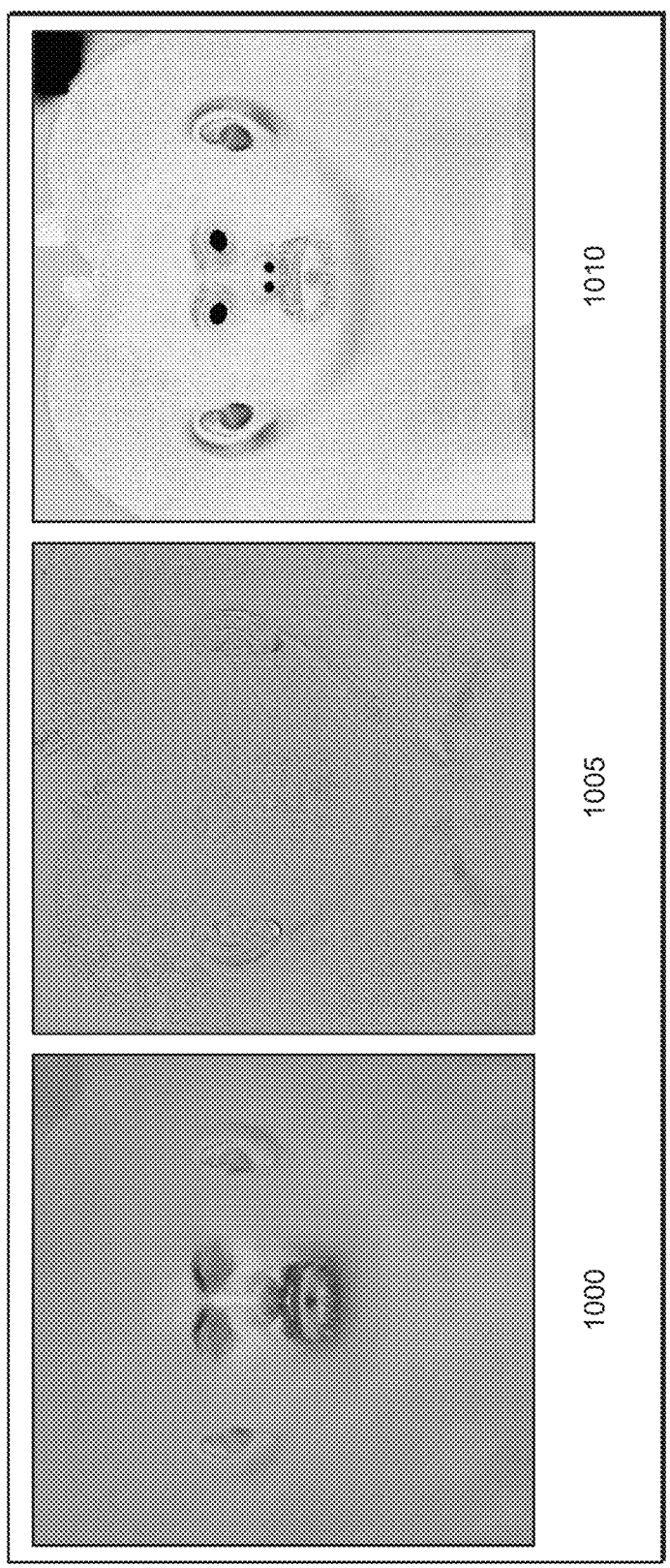
FIG. 10 shows a normal map and an ambient occlusion map for a specific input image.

FIG. 10 shows a normal map and an ambient occlusion map for a specific input image.

According to various exemplary embodiments, a three-dimensional ("3D") facial reconstruction pipeline comprises a shading component that synthesizes a normal map and an ambient occlusion map from a given input texture in the UV space. The input texture is usually a facial texture in the UV space, but the component would also work if the image is not in UV space. Both maps are produced using computer vision techniques. FIG. 10 shows a face albedo 1000 in UV space, a normal map of the face albedo 1005 in the UV space, and an ambient occlusion map of the face albedo 1010 in the UV space.

Figure 11:
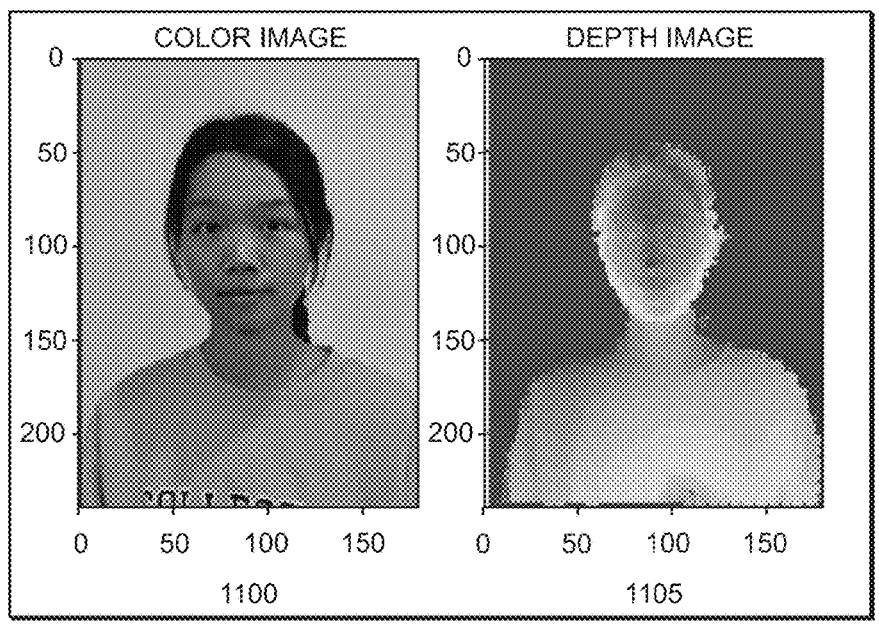
FIG. 11 shows an exemplary red-green-blue image and its depth channel components.

FIG. 11 shows an exemplary red-green-blue image and its depth channel components.

A three-dimensional ("3D") facial reconstruction pipeline, according to most exemplary embodiments, may take a single photo as an input. The 3D landmark coordinates used to deform the template face model are then inferred from the 2D pixel coordinates computed in the autolandmarking step so as to minimize some measure of geometric discrepancy in 3D with respect to the template. This process tends to make the reconstructed face similar to the template when looking sideways, as it merely extrapolates the subject's depth information from the template data.

For higher accuracy, the pipeline was extended to the case where a depth image acquired jointly with the input photo is available so that the input is an "RGBD image", that is, an image featuring the customary three color channels (red, green, blue) available from a photo, such as photo 1100, as well as an additional "depth channel," such as seen in depth image 1105. The depth channel assigns each pixel to the distance of its corresponding 3D point to the camera principal plane, or to the camera center of projection. Owing to the extra depth input, the 3D landmark coordinates are used to drive facial reconstruction and can be computed more accurately than using a single photo.

Figure 12:
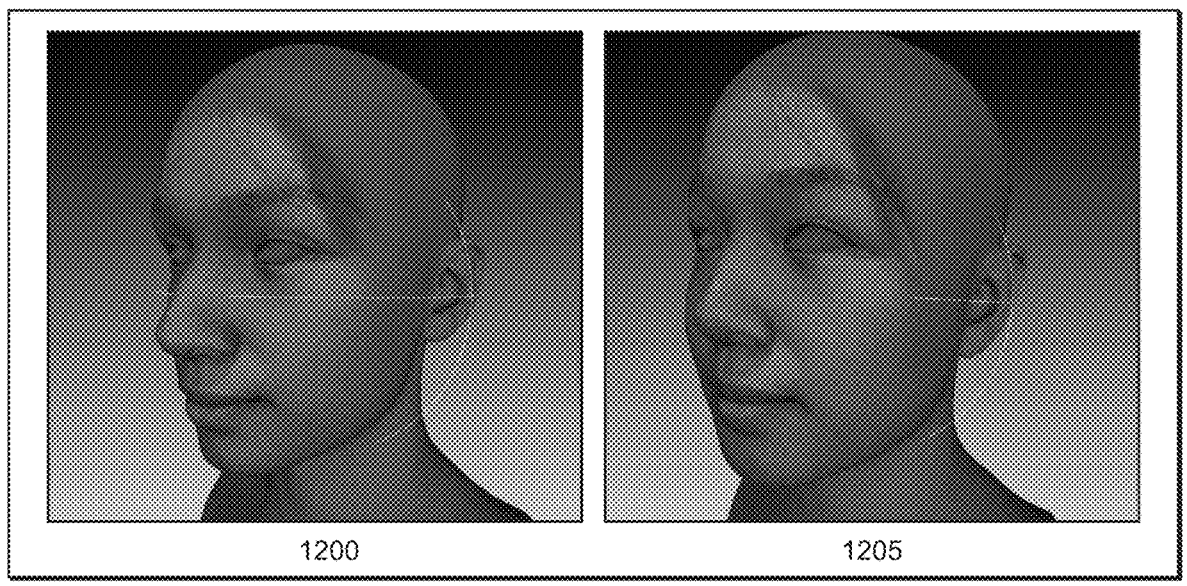
FIG. 12 shows a comparison of facial reconstruction methods.

FIG. 12 shows a comparison of facial reconstruction methods.

A two-dimensional ("2D") facial reconstruction pipeline, according to most exemplary embodiments, reconstructs a head geometry based on approximately 140 landmarks extracted automatically from an input photo using a machine vision algorithm. Due to the limited accuracy of depth measurements (which is also highly non-uniform in space), the depth value cannot be directly read from the depth map for each landmark. Instead, the measured depth data is used as an additional set of constraints to the template matching step, assuming measurement errors.

Turning again to FIG. 12, the comparison of facial reconstruction methods shows RGB input 1200 and RGBD input 1205. In the experiments shown in FIG. 12 with data provided by Huawei, a standard error of 0.3 cm was assumed on the depth measurement within a certain image region (typically excluding the outer part of the face).

Figure 13:
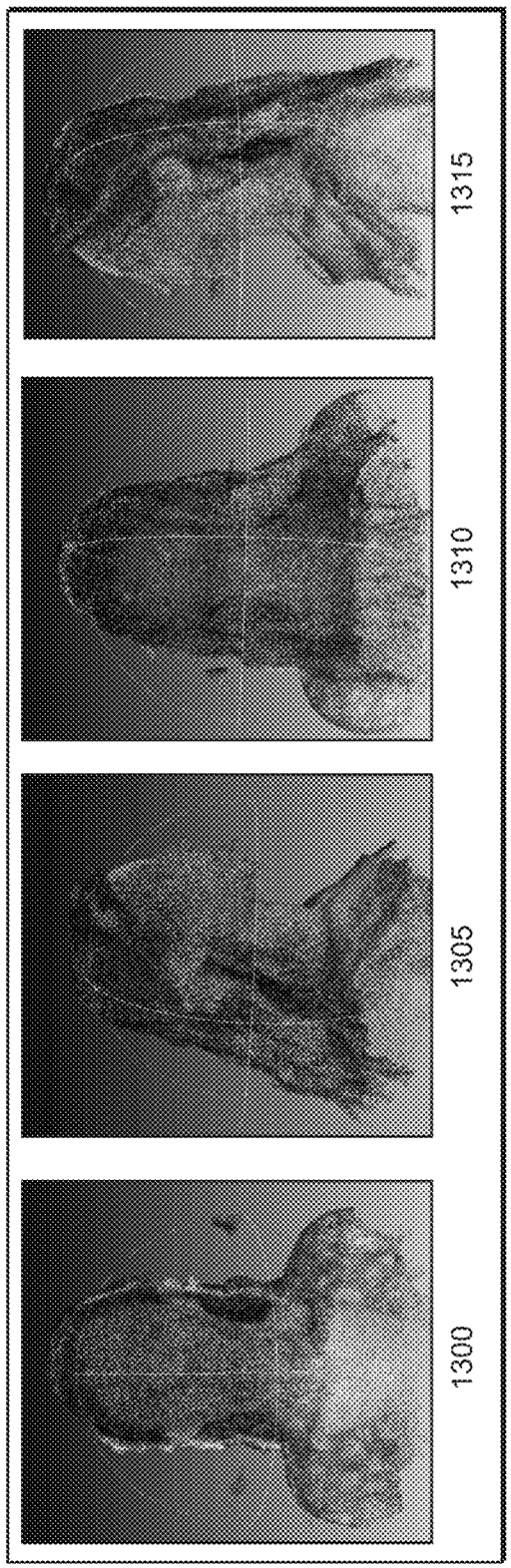
FIG. 13 shows an example of a full point cloud of a human head computed from a mobile scanner.

FIG. 13 shows an example of a full point cloud of a human head computed from a mobile scanner.

Exemplary embodiments employ real-time acquisition of RGBD data using both a front camera and a depth sensor all around a human subject. Some implementations include the use of a smartphone or a RGBD camera. This particular scanning procedure produces multiple RGBD images corresponding to different views of the head, covering up to 360° including the top of the head and chin.

The acquired scans are then submitted to a series of processing steps including converting the scans in real time into a point cloud using a classical point registration technique, namely the Iterative Closest Point algorithm. In addition to this geometric reconstruction, a sample of pixels is selected from the scan, at specific angles, to produce the facial texture later used in a 3D facial reconstruction pipeline. FIG. 13 shows a full head point cloud acquired using an app in several views: front 1300, right side 1305, back 1310 and left side 1315.

Figure 14:
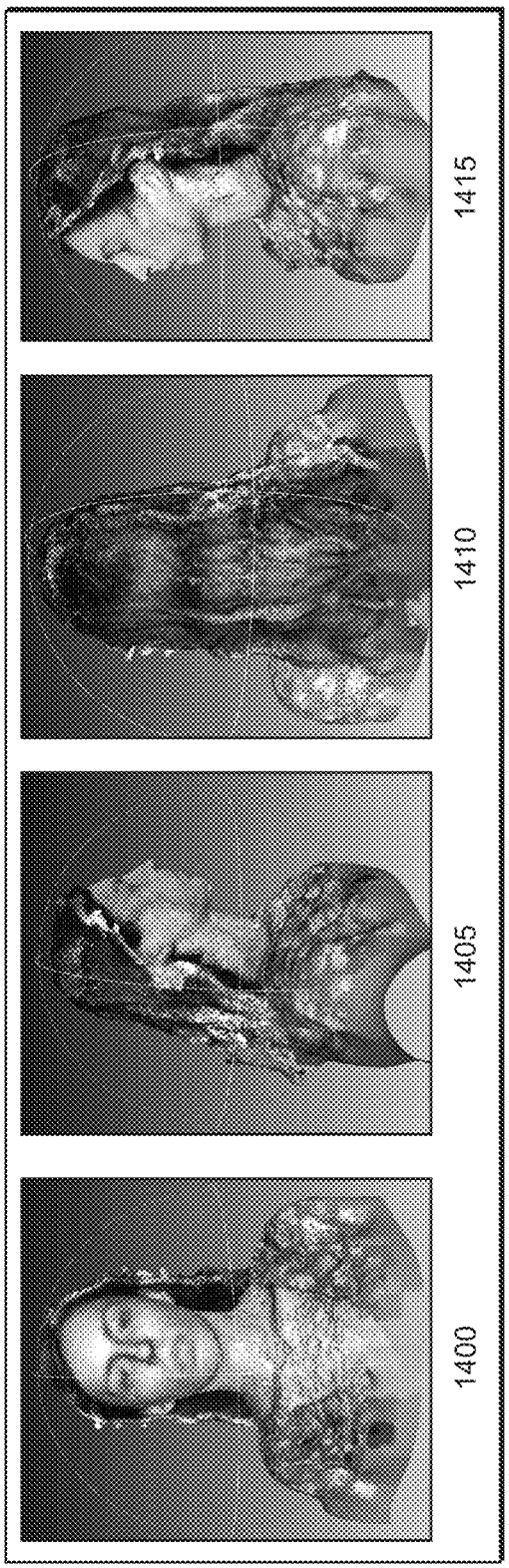
FIG. 14 shows an example of textured mesh computed from a mobile scanner.

FIG. 14 shows an example of textured mesh computed from a mobile scanner.

Following the conversion of scans into a point cloud, the point cloud is further converted into a mesh using an automated method such as Poisson surface reconstruction. Further mesh processing is applied (removal of duplicated vertices and triangles, removal of degenerate triangles, removal of non-manifold edges, and removal of unreferenced vertices) to produce a clean mesh.

Next, a texture material is produced for the mesh using the previously selected pixel scan sample. FIG. 14 shows the mesh produced from the head point cloud for the same scan as before, in several views: front 1400, right side 1405, back 1410 and left side 1415. Finally, the textured mesh computed from the input scans as described above may be input to the rigging method as an alternative to a single photo, a single RGBD image, or other types of imaging data. Higher face reconstruction fidelity is expected since the textured mesh encodes dense three-dimensional information without occlusions. The head reconstruction problem then boils down to a pure retopology problem (i.e., deforming the template mesh to match the input mesh).

In other exemplary embodiments, descriptor-based mesh deformation may be performed. A reconstructed head is produced by deforming an existing template mesh in 3D. In the default method instance, this deformation process is accomplished by matching a set of key points from the template head with their equivalent anatomical points detected on the input subject's head by the autolandmarking component. An alternative way to drive the template deformation process is to use descriptor-based target points as opposed to image-based points. Specifically, in this use case, the target points corresponding to the template key points are defined by a two-step process. First, the user specifies a set of descriptors; these can be quantitative (facial proportions, lengths, age, etc.) or qualitative ("feminine", "long nose", "strong jawline", "slanted eyes", etc.). Next, the user-supplied descriptors are converted into actual 3D point coordinates by automatically selecting head parts that best match the descriptors in an existing database of head meshes. This step is carried out by the numerical optimization of similarity measures corresponding to the relevant head part comparisons. The 3D coordinates defined in this manner are then used similarly to the standard case of image-based landmarks to drive the template deformation, resulting in a head mesh that optimally matches the input description. In addition to the possibility to incorporate user-supplied descriptors, the rig creation process can also output facial descriptors corresponding to the reconstructed head mesh properties. These are evaluated automatically at the end of the process using point distance computation on the key points associated with the final head mesh, and/or using the same type of database matching technique as described above to produce qualitative descriptors.

Rigging, retargeting and animation may be performed in further exemplary embodiments. Facial animation is usually done through automated motion capture or manually by a skilled artist. An alternative method is to animate the reconstructed head mesh via artificial intelligence. In this instance, the three-dimensional trajectories of the mesh points used to drive the mesh deformation over time are generated by a machine learning algorithm trained from a set of real-world videos and/or motion capture data to simulate realistic facial deformations. Such simulated yet plausible deformations can be generated depending on user-specified expression types (e.g. smiling, happy, sad, angry, etc.). This fully automated artificial intelligence based technique alleviates the need for subject-specific temporal data acquisition or manual editing for facial animation.

In some exemplary embodiments, mobile phone motion capture may be performed. Text to speech technology can be used to automatically convert a written text input by a user into a sequence of visemes. Such visemes are associated with pre-defined facial deformations encoded by template mesh points coordinates. Therefore, the reconstructed head mesh may be animated in synchrony with a synthetically produced audio speech, so that the lips deform while the speech is being produced and the character thus appears to be speaking.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for automatically generating an animatable object, the method comprising:
    automatically detecting one or more features of a received user input for a face, the automatically detecting comprising automatically determining a plurality of spatial coordinates for the face, each spatial coordinate of the plurality of spatial coordinates for the face being associated with one of the one or more features of the received user input for the face, the plurality of spatial coordinates for the face being determined using ray casting techniques;
    automatically deforming a template geometry based on the one or more detected features to automatically generate a custom geometry;
    automatically transferring a texture of the received user input to the custom geometry;
    automatically deforming a template control structure based on the one or more detected features to automatically generate a custom control structure; and
    automatically generating an animatable object having the custom geometry, the transferred texture, and the custom control structure.

2. The method of claim 1, further comprising automatically segmenting a light artifact on a facial texture.

3. The method of claim 2, where the light artifact is a shadow.

4. The method of claim 2, where the light artifact is a specular reflection.

5. The method of claim 1, further comprising automatically correcting light non-uniformity on a facial texture.

6. The method of claim 5, wherein the light non-uniformity is a level of brightness.

7. The method of claim 5, wherein the light non-uniformity is a level of color.

8. The method of claim 1, further comprising automatically producing a map for a facial texture.

9. The method of claim 1, further comprising synthesizing a normal map and an ambient occlusion map from an input texture to create a shading effect.

10. The method of claim 1, further comprising automatically using a depth image as an input for an image.

* * * * *